(12) United States Patent
Yamaguchi

(10) Patent No.: US 7,100,719 B2
(45) Date of Patent: Sep. 5, 2006

(54) HYBRID-POWERED VEHICLE

(75) Inventor: Koichi Yamaguchi, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 168 days.

(21) Appl. No.: 10/780,722

(22) Filed: Feb. 19, 2004

(65) Prior Publication Data

US 2004/0163862 A1    Aug. 26, 2004

(30) Foreign Application Priority Data

Feb. 25, 2003    (JP) ............................ 2003-047786

(51) Int. Cl.
*B60K 1/00* (2006.01)

(52) U.S. Cl. .................. 180/65.1; 180/65.2; 180/65.3; 180/65.4

(58) Field of Classification Search .............. 180/65.1, 180/65.2, 65.3, 65.4
See application file for complete search history.

(56) References Cited

U.S. PATENT DOCUMENTS

| | | | |
|---|---|---|---|
| 5,562,565 A | 10/1996 | Moroto et al. | |
| 5,806,617 A * | 9/1998 | Yamaguchi | 180/65.2 |
| 5,935,040 A * | 8/1999 | Tabata et al. | 477/3 |
| 5,944,630 A | 8/1999 | Omote | |
| 6,299,563 B1 | 10/2001 | Shimasaki | |
| 6,317,665 B1 * | 11/2001 | Tabata et al. | 701/22 |
| 6,741,917 B1 * | 5/2004 | Tomikawa | 701/22 |
| 6,913,558 B1 * | 7/2005 | Mori et al. | 477/3 |

FOREIGN PATENT DOCUMENTS

JP    2000-203287    7/2000

\* cited by examiner

*Primary Examiner*—J. Allen Shriver
*Assistant Examiner*—Cynthia F. Collado
(74) *Attorney, Agent, or Firm*—Pillsbury Winthrop Shaw Pittman

(57) ABSTRACT

A rotary shaft of a motor-generator of a hybrid-powered vehicle is connected to an output shaft of a torque converter connected to an output shaft of an internal combustion engine. A control of acceleration or deceleration of the vehicle is assisted by controlling the motor-generator as a motor or a generator during a time period in which a slip occurs in the torque converter with a speed change control.

4 Claims, 2 Drawing Sheets

HYBRID-POWERED VEHICLE

BACKGROUND OF THE INVENTION

1. Field of the Invention

The present invention relates to a hybrid-powered vehicle equipped with an internal combustion engine and a motor-generator. The present invention relates to a technology for realizing a hybrid-powered vehicle by mounting, as a power source, an internal combustion engine and a motor-generator on the vehicle having a power transmission system including a torque converter and a multistage transmission. The present invention relates to an improvement of drivability of a hybrid-powered vehicle and a reduction of energy loss caused by a torque converter of the vehicle.

2. Description of Related Art

In order to effectively utilize torque of an internal combustion engine of a vehicle as a power source thereof in a wide speed range, a transmission is provided between the power source and an axle of the vehicle. Besides, the vehicle having an automatic transmission, which does not require gear shift by a clutch pedal during a driving, has become popular recently and, nowadays, almost all drivers are familiar with such automatic transmission.

Although a planet gear type transmission or a continuously variable type transmission is known as a transmission for such automatic transmission, an automatic transmission system having a hydraulic torque converter and a multistage transmission combined in series with the hydraulic torque converter is popularly used. The multistage transmission has a structure in which a mechanical speed change operation is automatically controlled according to a control signal from a program control circuit. The transmission of this type has been improved on its design and manufacture and a structure of a change lever in a driver's seat, etc., can be designed very reasonably with high operability. Under the circumstances, it becomes possible to provide, at a reasonable price, a highly reliable transmission, which substantially improves drivability of a vehicle.

JP 2000-203287A (Toyota) discloses a hybrid-powered vehicle employing a transmission including a hydraulic torque converter and a mechanical multistage transmission combined with the hydraulic torque converter. A main object of the transmission disclosed in JP 2000-203287A is to prevent overrunning of a rotary shaft of a motor-generator during regenerative braking. So far, any hybrid-powered vehicle mounting a transmission including a hydraulic torque converter combined with a mechanical multistage transmission is not sold as a utility vehicle.

In a hydraulic torque converter, a slip occurs between an input shaft and an output shaft of the torque converter when a vehicle is accelerated or decelerated or when a speed change operation is performed. Moreover, such slip occurs when power is transmitted between the input shaft and the output shaft of the torque converter. Due to the slip, it is possible to smoothly perform a torque conversion correspondingly to a change of speed. However, the torque converter is heated by this slip, so that power energy is lost. In order to minimize the slip of the hydraulic torque converter connected in series with the mechanical multistage transmission and the power transmission system, a mechanism for mechanically locking up the input shaft and the output shaft of the torque converter when a difference in rotation speed between the input shaft and the output shaft thereof becomes smaller than a predetermined value has been considered. With using such mechanism, steady heat generation of the torque converter is prevented. Therefore, this mechanism has been utilized widely.

The hydraulic torque converter mentioned above is means for controlling the input shaft and the output shaft by utilizing the slip therebetween in such a way that the difference in rotation between the input shaft and the output shaft becomes smaller. Therefore, so long as a vehicle utilizes this torque converter, increase of specific fuel consumption of the vehicle is theoretically indispensable. That is, the utilization of the hydraulic torque converter and the substantial improvement of fuel economy by employing the hybrid powers of the internal combustion engine and the motor generator contradict each other. Therefore, it can be said so far that a transmission including a hydraulic torque converter is not employed in a hybrid-powered vehicle.

SUMMARY OF THE INVENTION

The inventors of the present invention focused to the fact that, even when a slip between an input shaft and an output shaft of a torque converter occurs, a hybrid-powered vehicle can be constructed such that energy loss due to the slip is reduced.

That is, an object of the present invention is to provide a hybrid-powered vehicle, which is capable of reducing energy loss in a torque converter, particularly, a hydraulic torque converter, even when the torque converter is used in a transmission. Another object of the present invention is to provide a hybrid-powered vehicle having excellent drivability. A further object of the present invention is to provide a hybrid-powered vehicle equipped with a transmission with a track record. Another object of the present invention is to provide a hybrid-powered vehicle equipped with a transmission, operation of which is familiar for many drivers.

In a hybrid-powered vehicle according to the present invention, a torque converter and a multistage transmission are connected in series with a power transmission system between an output shaft of an internal combustion engine and a propeller shaft for driving an axle of the vehicle. That is, an input shaft of the torque converter is directly connected to the output shaft of the internal combustion engine and an input shaft of the multistage transmission is connected to the output shaft of the torque converter. The propeller shaft is connected to the output shaft of the multistage transmission.

Further, a rotary shaft of a motor-generator is coupled to an output shaft side of the torque converter. Field current supplied to the motor-generator is controlled by a program control circuit and the motor-generator operates as a motor or a generator according to this control. In a motor mode in which the motor-generator operates as a motor, a storage battery mounted on the vehicle supplies electric energy to the motor-generator and rotary power is supplied to the output shaft side of the torque converter. In a generator mode in which the motor-generator operates as a generator, rotary power is supplied from the output shaft of the torque converter or from the propeller shaft through the multistage transmission to the motor-generator. The power energy is converted into electric energy to charge the storage battery mounted on the vehicle.

When a slip occurs in the torque converter, the motor-generator connected to the output shaft side of the torque converter operates to reduce the slip. That is, running load of the vehicle is exerted on the output shaft side of the torque converter. When the slip occurs in the mode in which rotation of the internal combustion engine connected to the input shaft of the torque converter is increased in resistance to the running load, the motor-generator is switched to the motor mode under control of the program control circuit. The rotary power generated by the motor becomes an auxiliary power for accelerating rotation of the output shaft, that is, the propeller shaft, of the torque converter. Electric energy required by the motor-generator in this case is supplied from the storage battery of the vehicle.

On the other hand, in a case where a slip between the output shaft and the input shaft of the torque converter occurs when the output shaft of the torque converter rotates at higher speed than the input shaft thereof connected to the output shaft of the internal combustion engine and a vehicle enters into an engine-braking mode, the program control circuit controls the motor-generator to operate the latter as a generator. The generator becomes an electrical braking state for the vehicle and converts the rotation energy into electric energy. The electric energy generated by the motor-generator recharges the storage battery of the vehicle.

In such control, even when there is a difference in rotation speed between the input shaft and the output shaft of the torque converter, it is possible to control the vehicle in such a way that substantial portion of such rotation difference becomes mechanical resistance within the torque converter and does not influence on the converter circuit. That is, even when there is a difference in rotation speed between the input shaft and the output shaft of the torque converter, power transmitted within the torque converter becomes small, so that it is possible to control the converter circuit in such a way that substantially no mechanical resistance occurs within the torque converter. Therefore, heat generation within the torque converter becomes small and power energy loss in the torque converter becomes small.

Even if a slip occurs in the torque converter, it is possible, by executing this control, to accelerate the vehicle by using the electric power or decelerate the vehicle by using the electric braking in a direction in which the slip becomes smaller. This control of the converter circuit is continued until the slip of the torque converter becomes small and the torque converter is locked up.

That is, in the hybrid powered vehicle having the internal combustion engine, the torque converter having the input shaft connected to the output shaft of the internal combustion engine, the multistage transmission connected to the output shaft of the torque converter, the motor-generator, the storage battery, the converter circuit for bidirectionally transmitting electric energy between the storage battery and the motor-generator and the program control circuit for controlling the converter circuit, the present invention is featured by that the rotary shaft of the motor-generator is connected to an output shaft side of the torque converter and that the program control circuit includes control means for making the motor-generator to share positive or negative torque with respect to an axle of the vehicle during a time period in which a slip occurs in the torque converter in a process of shifting of the multistage transmission when the vehicle is running.

The control means may include means for operating the motor-generator as a motor during a time period from a time instance when rotation speed of the output shaft of the torque converter is smaller than that of the input shaft thereof is detected and a slip occurs to a time instance when the locking-up thereof is performed. This mode is an auxiliary acceleration mode of the hybrid-powered vehicle. The control means may include means for operating the motor-generator as a generator during a time period from a time instance when rotation speed of the output shaft of the torque converter is larger than that of the input shaft thereof is detected and a slip occurs to a time instance of locking-up thereof is performed. This mode is a regenerative braking mode of the hybrid powered vehicle.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
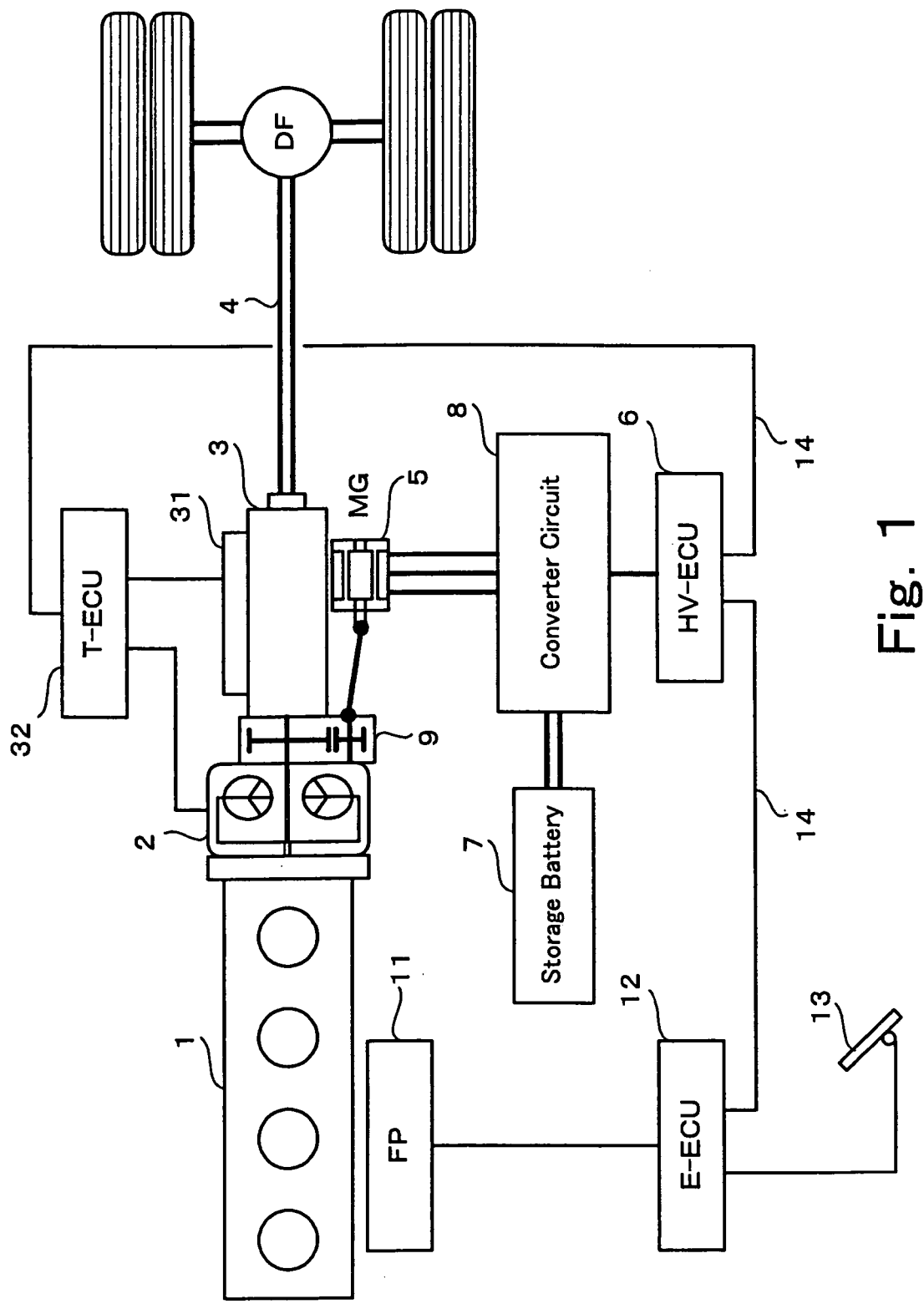
FIG. 1 is a block diagram showing a construction of an embodiment of a hybrid-powered vehicle according to the present invention.

FIG. 1 is a block diagram showing a construction of an embodiment of a hybrid-powered vehicle according to the present invention. An output shaft of an internal combustion engine 1 is directly connected to an input shaft of a hydraulic torque converter 2. An output shaft of the hydraulic torque converter 2 is fixedly connected to an input shaft of a multistage transmission 3 through a coupling unit 9. The multistage transmission 3 includes an actuator 31 for mechanically controlling a combination of shift gears of the multistage transmission 3 and a transmission control circuit 32 for electrically controlling the actuator 31. The transmission control circuit 32 comprises a program control circuit (ECU).

The transmission control circuit 32 determines an optimal gear ratio of the multistage transmission according to an input information including vehicle speed, engine rotation, operating information of accelerator pedal, etc. The actuator 31 mechanically controls the transmission operation of the multistage transmission 3 according to a control output of the transmission control circuit 32. Actuators of this kind are well known. The multistage transmission 3 in this embodiment is a well known standard transmission having 4 forward drive steps and 1 reverse drive step.

The hydraulic torque converter 2 bidirectionally transmits rotary power between the input shaft thereof (on the internal combustion engine side) and the output shaft (on the transmission side) through fluid. When there is a difference in rotation between the input shaft and the output shaft of the hydraulic torque converter, the hydraulic torque converter acts to reduce the rotation difference while transmitting torque and, when the rotation difference is reduced to a predetermined value (a predetermined ratio), mechanically locks up the input shaft and the output shaft according to the control of the transmission control circuit 32. Since a structure of the hydraulic torque converter operable as mentioned above is well known, detailed explanation thereof is omitted. A speed sensor is provided on the propeller shaft 4 and rotation sensors are provided in respective rotary portions of this mechanism. Rotation information generated by these rotation sensors are supplied to the transmission control circuit 32. Since these rotation sensors and wiring thereof may cause the figure to be complicated, they are not shown in FIG. 1.

The motor-generator 5 in FIG. 1 is a three-phase AC rotary machine. The motor-generator 5 acts as a motor when rotational phase velocity of three-phase AC current supplied to a field winding of the motor-generator is larger than a mechanical rotation speed and acts as a generator when rotational phase velocity of three-phase AC current supplied to the field winding of the motor-generator is smaller than a mechanical rotation speed. The rotational phase is generated by the converter circuit 8 under control of the program control circuit 6 to which the rotation information from the various rotation sensors are supplied. DC terminals of the converter circuit 8 are connected to the storage battery 7. The storage battery 7 in this embodiment is a nickel-hydrogen battery. Since a structure of the converter circuit 8 and its phase control in a hybrid-powered vehicle are well known, detailed explanation thereof is omitted.

Liquid fuel such as gasoline oil or diesel fuel is supplied through a fuel pump 11 to the internal combustion engine 1. The fuel pump 11 is controlled by an engine control circuit 12. A pedal operating state information from an accelerator pedal 13 of the hybrid-powered vehicle is supplied to the engine control circuit 12. The engine control circuit 12, the program control circuit 6 for performing an energy control of the hybrid-powered vehicle and the transmission control circuit 32 for controlling the transmission are commonly connected to a single connecting bus 14 so that they can use their information mutually. Since such construction is also well known, detailed explanation thereof is omitted in this specification.

A featured structure of the present invention resides in that the rotary shaft of the motor-generator 5 is connected to the output shaft side of the hydraulic torque converter 2. In this embodiment, the coupling unit 9 is provided on the output shaft of the hydraulic torque converter 2 and the rotary shaft of the motor-generator 5 is steadily connected to the output shaft of the hydraulic torque converter 2 through the coupling unit 9. A suitable gear ratio corresponding to characteristics of the internal combustion engine 1 and characteristics of the motor-generator 5 is set in this coupling gear. Further, in this coupling unit 9, the output shaft of the hydraulic torque converter 2 is directly connected to the input shaft of the multistage transmission 3.

Further, the present invention is featured by a controlling operation of the program control circuit 6 for controlling the hybrid power. That is, the lock-up of the hydraulic torque converter 2 is cancelled with a timing of execution of a shift operation of the multistage transmission 3 during running of the vehicle, under control of the transmission control circuit 32. And, a new gear ratio is set in the multistage transmission 3 under controls of the transmission control circuit 32 and the actuator 31. When the hybrid-powered vehicle is accelerated or decelerated according to the newly set gear ratio of the multistage transmission 3, a state in which a slip may occur in the hydraulic torque converter 2 is established. When the program control circuit 6 detects such slip from the output of the rotation sensor (not shown for the reason mentioned above), the program control circuit sets the motor-generator 5 in the auxiliary acceleration mode or the regenerative braking mode.

That is, when the program control circuit detects an occurrence of a slip due to a condition that rotation speed of the output shaft of the torque converter 2 is smaller than rotation speed of the input shaft thereof (the output shaft of the internal combustion engine 1), the program control circuit controls the motor-generator 5 as the motor to set the vehicle to the auxiliary acceleration mode. The slip in this direction usually occurs when the multistage transmission 3 is shifted up and the vehicle is accelerated by the internal combustion engine 1. In this case, the hybrid-powered vehicle according to the present invention is also accelerated by electric power, so that the operation of the vehicle is controlled to a direction in which the slip occurred in the hydraulic torque converter 2 is reduced. When the slip in the hydraulic torque converter 2 becomes a predetermined small value, the hydraulic torque converter 2 is locked up under control of the transmission control circuit 32 and the input and output shafts of the torque converter 2 are mechanically connected mutually. The auxiliary acceleration mode is suspended at this time point.

When a slip occurs in a shifting process of the multistage transmission 3 due to the condition that rotation speed of the output shaft of the torque converter 2 is larger than that of the input shaft thereof (the output shaft of the internal combustion engine 1), the motor-generator 5 is controlled to operate as the generator. Therefore, the vehicle becomes the regenerative braking mode in which the electric braking, that is, power generation, is performed and the thus generated electric energy is used to recharge the storage battery 7. Thus, the vehicle is decelerated, so that the slip occurred in the torque converter 2 becomes smaller. When the slip becomes a predetermined small value, the lock-up is executed under control of the transmission control circuit 32, so that the input and output shafts of the torque converter 2 are mechanically connected mutually. A control performed by the transmission control circuit after the lock-up is executed is similar to the usual control of the hybrid-powered vehicle.

Figure 2:
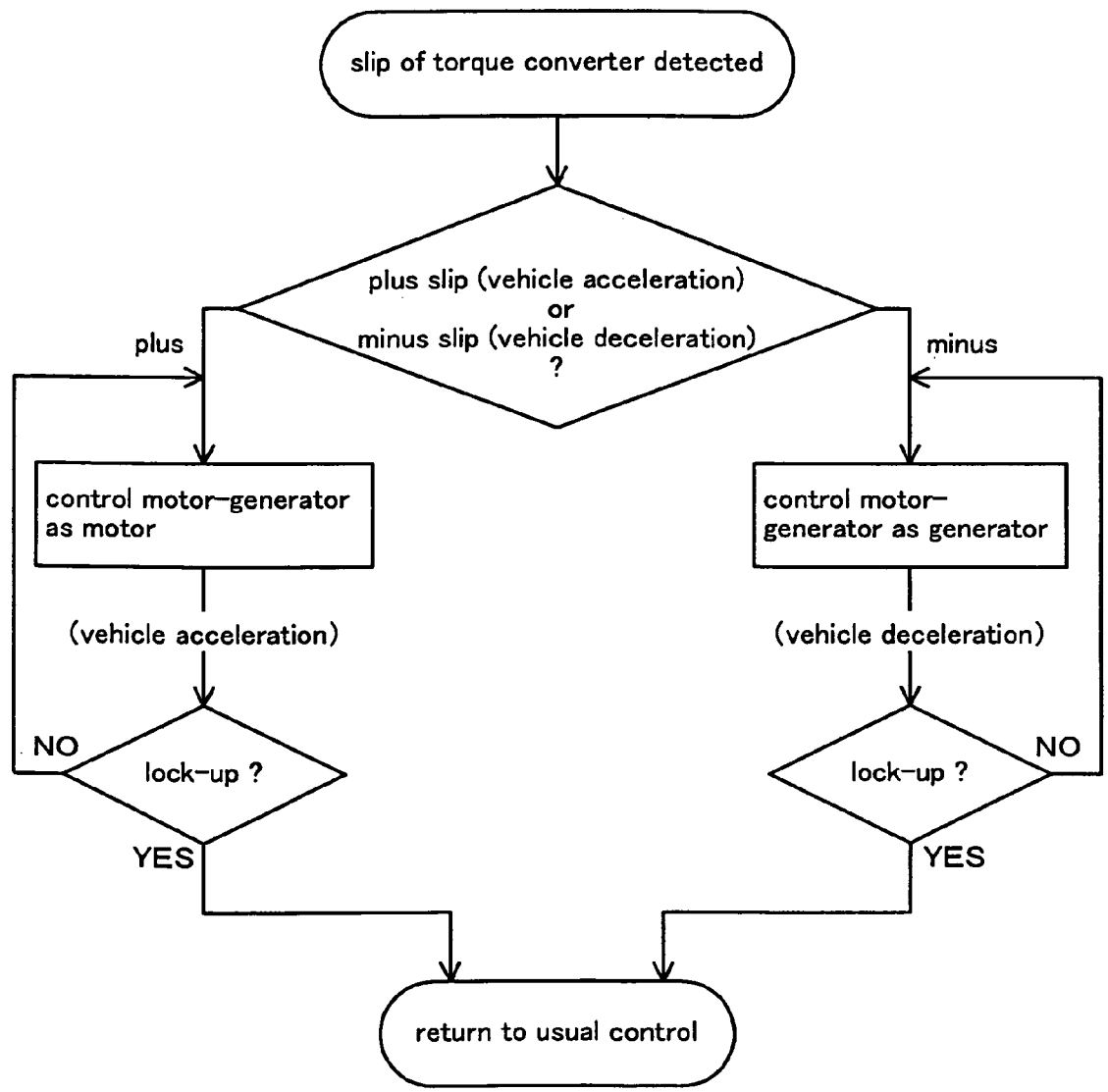
FIG. 2 is a control flowchart of the embodiment shown in FIG. 1.

FIG. 2 is a control flowchart explaining this operation, which is a feature of the hybrid-powered vehicle according to the present invention. Other operations of the present vehicle than the operation in the time period during which the vehicle is accelerated or decelerated through the hydraulic torque converter 2 and the slip occurs in the torque converter 2 are the same as those of the usual hybrid-powered vehicle.

Under this control, the motor-generator 5 generates auxiliary power or auxiliary braking force for the period during which the slip occurs in the torque converter 2. Since the vehicle is accelerated or decelerated by the auxiliary power or the auxiliary braking force, a time period until the lock-up of the torque converter 2 is shortened. Further, the driving force generated by the internal combustion engine 1 or the braking force consumed for engine braking by the internal combustion engine 1 during the time period in which slip occurs in the torque converter 2 becomes small correspondingly. Therefore, power energy transmitted through the torque converter 2 becomes small, so that it is possible to reduce heat generation of the torque converter 2, that is, energy consumption of the torque converter 2.

According to the present invention, it is possible to provide a hybrid-powered vehicle having a torque converter in a power system thereof with power energy loss in a torque converter thereof being reduced. According to the present invention, it is possible to improve drivability of a hybrid-powered vehicle. According to the present invention, it is possible to provide a hybrid-powered vehicle, which is equipped with a transmission recognized by drivers as reliable and has drivability familiar for drivers.

What is claimed is:

1. A hybrid-powered vehicle comprising:
   an internal combustion engine;
   a torque converter having an input shaft connected to an output shaft of said internal combustion engine;
   a multistage transmission connected to an output shaft of said torque converter;
   a motor-generator;
   a storage battery; and a converter circuit for bidirectionally transmitting electric energy between said storage battery and said motor-generator and a program control circuit for controlling said converter circuit, said motor-generator having a rotary shaft connected to an output shaft side of said torque converter, said program control circuit including control means for saddling said motor-generator with torque for an axle of said vehicle during a time period in which a slip occurs in said torque converter in a shifting process of said multistage transmission during a running of said vehicle.

2. The hybrid-powered vehicle as claimed in claim 1, wherein said control means includes means for operating said motor-generator as a motor during a time period from a time instance at which a slip is detected under a condition that rotation speed of said output shaft of said torque converter is lower than rotation speed of said input shaft of said torque converter to a time instance at which said torque converter is locked up.

3. The hybrid-powered vehicle as claimed in claim 1, wherein said control means includes means for operating said motor-generator as a generator during a time period from a time instance at which a slip is detected under a condition that rotation speed of said output shaft of said torque converter is higher than rotation speed of said input shaft of said torque converter to a time instance at which said torque converter is locked up.

4. The hybrid-powered vehicle as claimed in claim 1, wherein said torque converter is a hydraulic torque converter.

* * * * *